(12) United States Patent
Schoonover et al.

(10) Patent No.: US 6,362,952 B1
(45) Date of Patent: Mar. 26, 2002

(54) PRESS-IN BUS INSULATION MOUNTING ASSEMBLY

(75) Inventors: Marc Evan Schoonover, Lincoln; James M. Campbell, Atlanta; Victor Lee Cowser, Warrensburg, all of IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/750,491

(22) Filed: Dec. 27, 2000

(51) Int. Cl.[7] ................................................. H02B 1/04
(52) U.S. Cl. .............. 361/648; 174/166 S; 248/224.51; 361/809; 439/573
(58) Field of Search .................................. 362/627, 637, 362/641, 644, 648, 673, 807, 810, 809; 248/27.1, 222.12, 223.41, 224.51, 224.61, 224.8; 439/460, 574, 571–573; 174/68.2, 70 B, 71 B, 72 B, 99 B, 149 B, 164, 166 R, 166 S

(56) References Cited

U.S. PATENT DOCUMENTS

| 3,610,561 | A | * | 10/1971 | Greenwood | .............. 248/205.1 |
| 3,784,878 | A | * | 1/1974 | Neu | ............................ 361/761 |
| 4,162,517 | A | * | 7/1979 | Reed | ........................... 361/644 |
| 5,420,749 | A | * | 5/1995 | Gehrs et al. | ................ 361/634 |
| 5,745,337 | A | | 4/1998 | Reiner | |

* cited by examiner

Primary Examiner—Gerald Tolin
(74) Attorney, Agent, or Firm—Martin J. Moran

(57) ABSTRACT

A mounting assembly for a plurality of panel board electrical buses which are disposed within a panel board housing, said mounting assembly which includes a mounting plate and a bus insulator assembly. The mounting plate has a front side, a back side and a plurality of bus insulator assembly pin openings therethrough. The mounting plate is sized to fit within said panel board housing. The mounting assembly further includes bus insulator assembly pin openings located within conical depressions on said mounting plate. The bus insulator assembly has mounting pins. When assembled, the bus insulator assembly mounting pins pass through the bus insulator assembly pin openings.

12 Claims, 3 Drawing Sheets

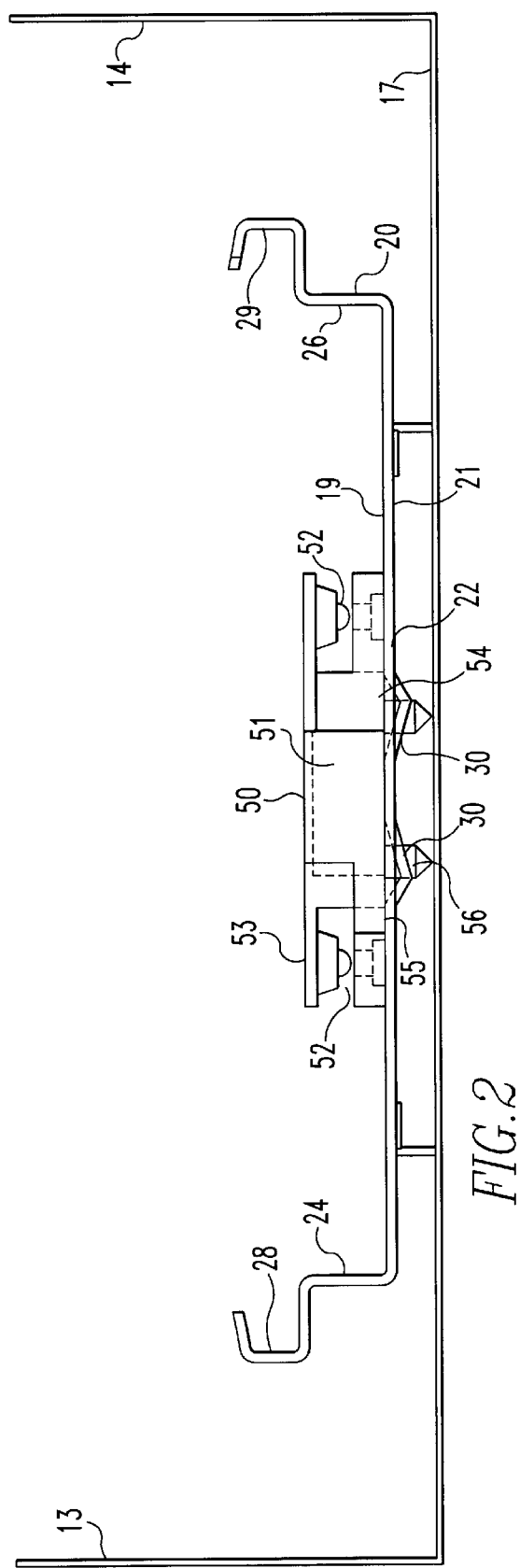
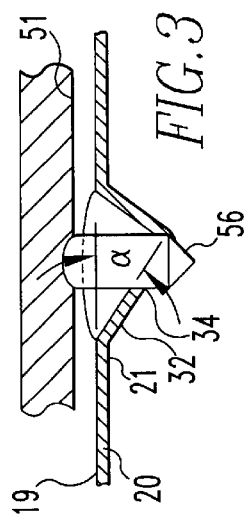
FIG. 2
FIG. 3

PRESS-IN BUS INSULATION MOUNTING ASSEMBLY

BACKGROUND OF THE INVENTION

1. Field of the Invention

This invention relates to a mounting assembly for a panel board bus insulation assembly and, more specifically, to a mounting assembly which includes a mounting plate which couples the bus insulation assembly to the mounting assembly without the use of heat staking or mechanical fasteners.

2. Description of the Prior Art

Panel boards are a convenient method for positioning a plurality of circuit breakers between a power source and a load. The panel board includes a plurality of current conducting buses which are generally aligned parallel to each other within the panel board. Circuit breakers are disposed between the buses thereby connecting the line side and the load side buses. The circuit breakers are mounted on, and the buses are mounted in, a mounting assembly. The mounting assembly typically includes a bus insulation assembly and a mounting plate. The bus insulation assembly maintains proper alignment of the buses and provides a plurality of openings where fasteners on the circuit breakers may be passed through to thereby couple the circuit breaker to the bus. The bus insulation assembly generally includes a plurality of pins extending from the back side. The bus insulation assembly and the pins are both made from a dielectric material such as certain plastics. Generally, the mounting plate includes a plurality of openings. The pins on the bus insulation assembly are passed through the mounting plate openings, resulting in the bus insulation assembly being disposed immediately adjacent to the mounting plate with the pins extending beyond the mounting plate. Heat is applied to the exposed ends, thereby melting and deforming the ends so that the pins can not be passed back through the mounting plate openings. Alternatively, the bus insulation assembly can be fixed to the mounting plate with other types of fasteners, such as screws.

These types of mounting assembly have several disadvantages. For example, by applying heat to the mounting pins, the structural integrity of a mounting pin is compromised making the mounting pin more susceptible to breakage. Another disadvantage of this configuration is that the contact point between the mounting plate and the bus insulation assembly is immediately adjacent to the body of the bus insulation assembly. If the panel board assembly is dropped, during shipping for example, the bus insulation assembly would slide relative to the front face of the mounting bracket causing shear loads on the mounting pins. This may cause the pins to shear off in the mounting openings. Use of fasteners adds additional costs to the manufacture of the mounting assembly due to additional components and assembly time.

There is, therefore, a need for a mounting assembly which does not require reheating the bus insulation assembly mounting pins.

There is a further need for a mounting assembly which allows the mounting pins to flex so that the pins will not be damaged should the panel board be dropped.

There is a further need for a mounting assembly which can be assembled in a cost efficient manner.

SUMMARY OF THE INVENTION

These needs, and others, are met by the invention which provides a mounting assembly having a bus insulation assembly with extended mounted pins and a mounting plate having depressed conical mounting pin openings.

The bus insulation assembly is made from a dielectric material such as plastic. The bus insulation assembly includes a plurality of channels through which a plurality of electrical busses may be passed. The bus insulation assembly also includes a plurality of extended mounting pins. The metal mounting plate of the present invention includes depressed conical openings which are sized to fit tightly around the bus insulation assembly's mounting pins. The edge of the mounting plate openings may be sharp. When the mounting pins are inserted through the mounting plate depressed conical openings, the sharp edge of the depressed conical openings engages, or digs into, the dielectric material. This engagement prevents the bus insulation assembly from being easily removed from the mounting plate. Thus, the bus insulation assembly is secured to the mounting plate without heating the mounting pins and without requiring additional fasteners. Because the mounting pins have an extended length and the conical depression ensures that the contact point between the mounting plate and the pin is spaced from the bus insulation assembly, the mounting pins may flex when the bus insulation assembly is subjected to extreme shear loads, for example, an impact load caused by dropping the panel board.

BRIEF DESCRIPTION OF THE DRAWINGS

A full understanding of the invention can be gained from the following description of the preferred embodiments when read in conjunction with the accompanying drawings in which:

FIG. 2 is a side view of the mounting assembly taken along line 2—2 of FIG. 1.

FIG. 3 is a detail of a mounting pin within a mounting plate opening.

DETAILED DESCRIPTION OF THE PREFERRED EMBODIMENT

Figure 1:
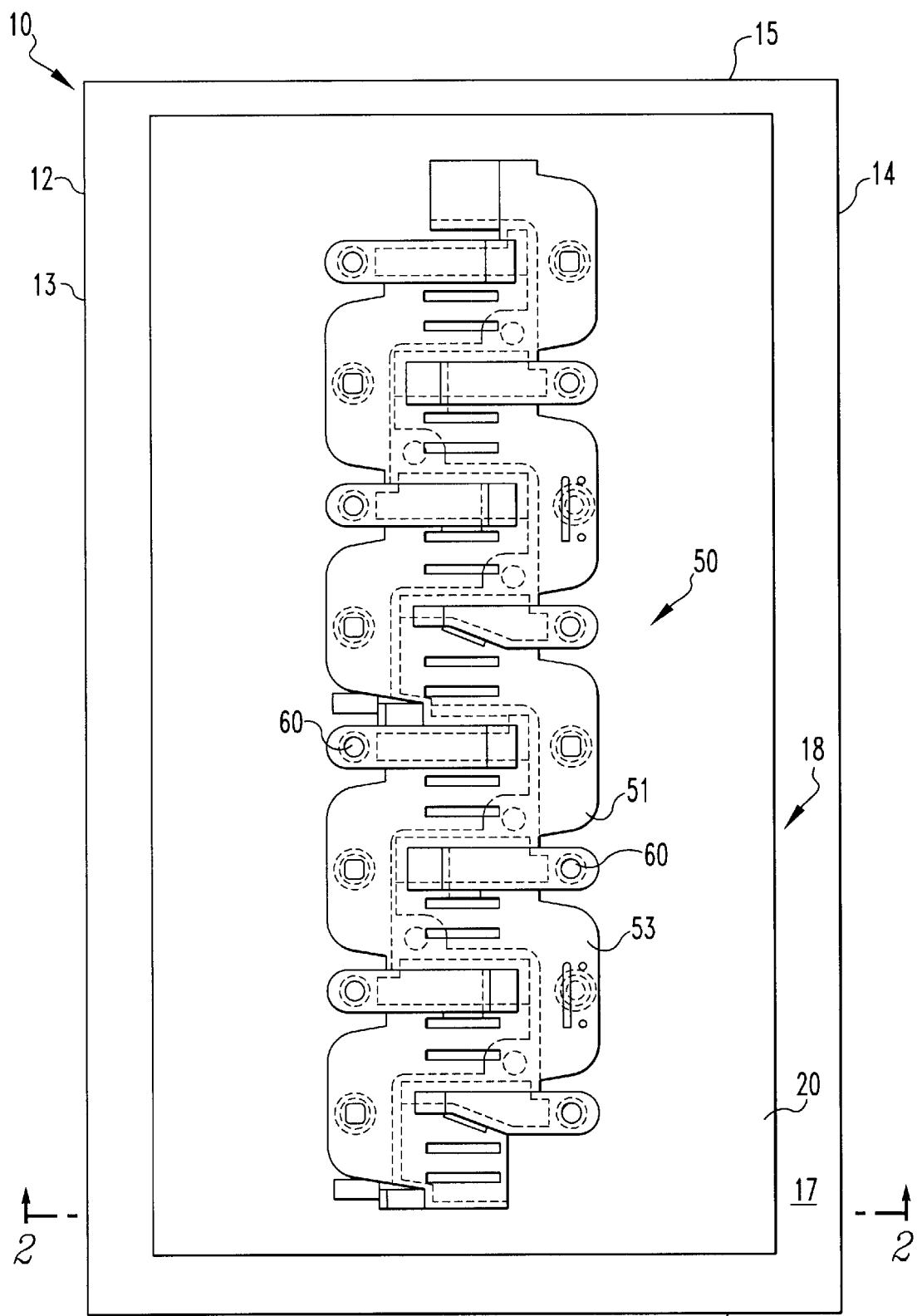
FIG. 1 is a front view of the mounting assembly mounted on a panel board.

As shown in FIG. 1, a panel board 10 includes a housing 12, having sides 13, 14, 15, 16 and a back plate 17. A mounting assembly 18, which includes a mounting plate 20 and a bus insulation assembly 50, is disposed within the housing 12. As shown in FIG. 2, the mounting plate 20 has a front side 19, a back side 21, and a plurality of mounting openings 30. The mounting plate 20 is attached to, and held in spaced relation from, back plate 17 by any common means, such as spacers, between mounting plate 20 and back plate 17. The mounting plate 20 may have a generally C-shaped cross-section. A mounting plate 20 with a generally C-shaped cross-section includes a mounting portion 22, sidewalls 24, 26, and mounting brackets 28–29.

As shown in FIG. 3, the mounting openings 30 are formed as a conical depression having a sidewall 32 extending from the mounting plate back side 21. The sidewall terminates in a back edge 34. The back edge 34 may be sharp. The back edge 34 forms a plane which is not parallel to the plane of mounting portion 22. As represented by angle ↦, preferably the back edge 34 is angled from about 40° to 50°, and more preferably about 45°, from the plane of mounting plate 20. The diameter of the mounting openings 30 is preferably about 0.156 inch. The maximum diameter of the conical depression is about 0.50 inch.

As shown in FIG. 1, bus insulator assembly 50 has a body 51 made from a dielectric material such as plastic. Bus insulation assembly 50 includes a plurality of channels 52 (FIG. 2), formed within the body 51. Electrical buses 54 are disposed within channels 52. The busses 54 may be coupled to either a line or a load. Bus insulation assembly 50 further includes a plurality of stabs 60 which are adapted to be coupled to circuit breakers (not shown). The circuit breakers bridge the line side buses and the load side buses.

The bus insulation assembly 50 further includes a front side 53 and a back side 55. A plurality of mounting pins 56 extend from bus assembly back side 55. The mounting pins 56 have a sufficient length to extend through mounting openings 30 when bus assembly back side 55 is placed in contact with mounting plate front side 19. The pins 56 are secured on the openings 30 by an interference fit.

Bus insulation assembly 50 may be attached to mounting plate 20 by pressing mounting pins 56 through openings 30. When mounting pins 56 are inserted through mounting openings 30 and an attempt to withdraw bus insulation assembly 50 is made, back edge 34 engages, or digs into, the plastic material of mounting pins 56 thereby resisting the removal of mounting pins 56 from openings 30. Additionally, because mounting pins 56 have an extended length, the mounting pins 56 may flex. As such, there is a certain amount of play for bus insulation assembly 50 to move relative to mounting plate 20. Thus, if during the transport of the panel board 10, if the panel board 10 is impacted, e.g., by dropping the panel board 10, the mounting pins 56 will flex allowing bus insulation assembly 50 to move relative to mounting plate 20.

Figure 4:
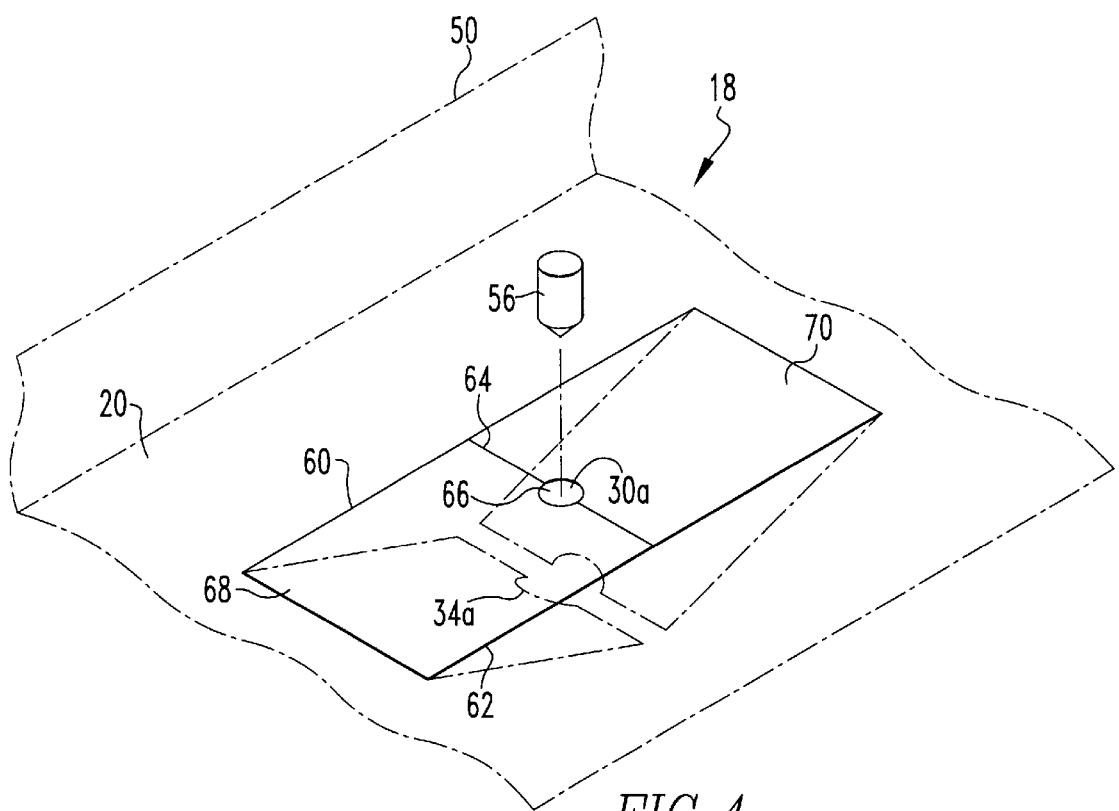
FIG. 4 is an isometric detail view of an alternative configuration.

As shown in FIG. 4, the mounting assembly 18 may be constructed using mounting openings 30a having a bifurcated conical depression. In this embodiment the mounting plate 20 has two generally parallel slits 60, 62. A third slit 64 extends in a perpendicular direction to the parallel slits 60, 62 at about the mid-point of the parallel slits 60, 62. The third slit 64 terminates in a back edge 34a that may be sharp. The third slit 64 may have a cut-out 66 sized to have an interference fit with mounting pins 56. The arrangement of slits 60, 62, 64, form two leaves 68, 70 that have one end that is integral to mounting plate 20. When assembled, the mounting pins 56 are inserted through third slit 64 causing leaves 68, 70 to deflect away (shown in ghost) from the bus insulator assembly 50.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A mounting assembly for a plurality of panel board electrical buses which is disposed within a panel board housing, said mounting assembly comprising:

a mounting plate, having a front side, a back side and a plurality of bus insulator assembly pin openings therethrough, sized to fit within said panel board housing;

said bus insulator assembly pin openings located within conical depressions on said mounting plate;

a bus insulation assembly having mounting pins; and said mounting pins passing through said bus insulator assembly pin openings.

2. The mounting assembly of claim 1, wherein:

said bus insulator assembly pin openings include a back edge; and said back edge is not parallel to the plane of said mounting plate.

3. The mounting assembly of claim 2, wherein said back edge is at an angle of about 40° to 50° from said plane of said mounting plate.

4. The mounting assembly of claim 3, wherein said back edge is at an angle of about 45° from the plane of said mounting plate.

5. The mounting assembly of claim 1, wherein the diameter of the conical depression at said bus insulator assembly pin opening is about 0.156 inch and the maximum diameter of the conical depression about 0.50 inch.

6. The mounting assembly of claim 1, wherein said conical depression is a bifurcated conical depression formed by two generally parallel slits and a generally perpendicular slit.

7. A circuit breaker panel comprising:

a housing having four sides and a back plate;

a mounting plate, sized to fit within said panel board housing, having a front side, a back side and a plurality of bus insulator assembly pin openings therethrough;

said bus insulator assembly pin openings located within conical depressions on said mounting plate;

said mounting plate attached in a spaced relation to said back plate;

a bus insulation assembly having mounting pins; and said mounting pins passing through said bus insulator assembly pin openings.

8. The circuit breaker panel of claim 7, wherein:

said bus insulator assembly pin openings include a back edge; and said back edge is not parallel to the plane of said mounting plate.

9. The circuit breaker panel of claim 8, wherein said back edge is at an angle of about 40° to 50° from said plane of said mounting plate.

10. The circuit breaker panel of claim 9, wherein said back edge is at an angle of about 45° from the plane of said mounting plate.

11. The circuit breaker panel of claim 7, wherein the diameter of the conical depression at said bus insulator assembly pin opening is about 0.156 inch and the maximum diameter of the conical depression about 0.50 inch.

12. The circuit breaker panel of claim 7, wherein said conical depression is a bifurcated conical depression formed by two generally parallel slits and a generally perpendicular slit.

* * * * *